US012800112B2

(12) United States Patent
Yang et al.

(10) Patent No.: US 12,800,112 B2
(45) Date of Patent: Nov. 17, 2026

(54) VORTEX PREVENTION APPARATUS AND INSULATION TANK COMPRISING SAME

(71) Applicant: INNOSPACE CO., LTD., Sejong (KR)

(72) Inventors: Chang Hwan Yang, Sejong (KR); Seung Won Cha, Sejong (KR); Do Yun Won, Sejong (KR); Soo Jong Kim, Sejong (KR)

(73) Assignee: INNOSPACE CO., LTD., Sejong-si (KR)

( * ) Notice: Subject to any disclaimer, the term of this patent is extended or adjusted under 35 U.S.C. 154(b) by 38 days.

(21) Appl. No.: 18/829,716

(22) Filed: Sep. 10, 2024

(65) Prior Publication Data

US 2025/0003555 A1 Jan. 2, 2025

Related U.S. Application Data

(63) Continuation of application No. PCT/KR2023/003567, filed on Mar. 17, 2023.

(30) Foreign Application Priority Data

Mar. 23, 2022 (KR) ........................ 10-2022-0036011

(51) Int. Cl.
*F17C 13/06* (2006.01)
*B64G 1/40* (2006.01)
(Continued)

(52) U.S. Cl.
CPC .............. *F17C 9/00* (2013.01); *B64G 1/4021* (2023.08); *F17C 3/02* (2013.01); *F17C 13/06* (2013.01);
(Continued)

(58) Field of Classification Search
CPC ........ F17C 2205/03; F17C 13/06; F17C 9/00; F17C 2201/032; B65D 88/54; B65D 88/747
See application file for complete search history.

(56) References Cited

U.S. PATENT DOCUMENTS 4,134,162 A 1/1979 Sharland et al.
5,063,651 A * 11/1991 Kneip, Jr. .............. C23G 1/125 220/592.27

(Continued)

FOREIGN PATENT DOCUMENTS

JP H2-27232 B2 6/1990
KR 10-0957053 B1 5/2010

(Continued)

*Primary Examiner* — Stephen J Castellano
(74) *Attorney, Agent, or Firm* — United One Law Group LLC; Kongsik Kim; Jhongwoo Peck

(57) ABSTRACT

A vortex prevention apparatus prevents a vortex from being generated at an outlet provided in the tank member and minimizes the change in the flow rate of the fluid being discharged through the outlet when a fluid filled in a tank member such as an insulation tank is being discharged, To this end, the vortex prevention apparatus is integrally coupled to a lower cover, having at least one outlet through which the fluid filled in the insulation tank is discharged, of a lower cap of the insulation tank, and includes a prevention body having a cone shape centered on an apex portion; spacing members extending vertically and horizontally from the prevention body; and mesh hole portions formed passing through the edges of the prevention body by the spacing members.

3 Claims, 6 Drawing Sheets

(51) Int. Cl.
*F17C 3/02* (2006.01)
*F17C 9/00* (2006.01)

(52) U.S. Cl.
CPC *F17C 2201/0109* (2013.01); *F17C 2201/032* (2013.01); *F17C 2205/03* (2013.01); *F17C 2265/066* (2013.01)

(56) References Cited

U.S. PATENT DOCUMENTS

| | | | | |
|---|---|---|---|---|
| 6,014,987 | A | 1/2000 | List et al. | |
| 8,202,357 | B2 | 6/2012 | Behruzi et al. | |
| 2002/0040569 | A1 * | 4/2002 | Reinhold ............. | B01D 46/521<br>55/498 |
| 2003/0196705 | A1 | 10/2003 | Grayson | |
| 2015/0252753 | A1 | 9/2015 | Lopez et al. | |

FOREIGN PATENT DOCUMENTS

| | | | |
|---|---|---|---|
| KR | 10-2011-0138577 | A | 12/2011 |
| KR | 10-2028288 | B1 | 10/2019 |
| WO | 2009/124691 | A1 | 10/2009 |

* cited by examiner

VORTEX PREVENTION APPARATUS AND INSULATION TANK COMPRISING SAME

CROSS-REFERENCE TO RELATED APPLICATIONS

This application is a Continuation of International Application No. PCT/KR2023/003567 filed Mar. 17, 2023, which claims priority from Korean Application No. 10-2022-0036011 filed Mar. 23, 2022. The aforementioned applications are incorporated herein by reference in their entireties.

TECHNICAL FIELD

The present disclosure relates to a vortex prevention apparatus and an insulation tank including the same and, more particularly, to a vortex prevention apparatus, which prevents a vortex from being generated at an outlet provided in a tank member such as an insulation tank when a fluid filled in the tank member is being discharged, and minimizes a change in the flow rate of the fluid being discharged through the outlet, and an insulation tank including the same.

RELATED ART

The oxidizer tank of a launch vehicle is connected to a combustor and supplies a liquid oxidizer necessary for combustion to the combustor.

In this case, as the liquid oxidizer in the oxidizer tank is exposed to the structural characteristics of the launch vehicle and various environments, a vortex in which the liquid oxidizer rotates occurs during the process of discharging the liquid oxidizer inside the oxidizer tank. When the liquid oxidizer is lowered to a predetermined level due to this vortex, the liquid oxidizer flows into the combustor along with pressurized gas and the flow rate of the pure liquid oxidizer is reduced, causing a very serious problem of deteriorating a combustion performance in the combustor. In particular, in the case of a liquid oxidizer with a low water level, the moving area of a fluid increases due to the sloshing of the fluid at an outlet, and thus the fluid does not pass through the outlet stably, and as a result, a problem occurs in which the flow of the fluid into a combustion chamber is not steady.

A prior art document includes Korean Patent No. 10-0957053 (published on May 13, 2010, invention title: SAFETY INJECTION TANK WITH VORTEX PREVENTION DEVICE).

SUMMARY

The present disclosure has been made to solve the above problems occurring in the prior art, and is intended to propose a vortex prevention apparatus, which prevents a vortex from being generated at an outlet provided in a tank member such as an insulation tank when a fluid filled in the tank member is being discharged, and prevents a change in the flow rate of the fluid being discharged through the outlet, and an insulation tank including the same.

In order to accomplish the objectives of the present disclosure described above, according to an exemplary embodiment, there is provided a vortex prevention apparatus of the present disclosure coupled to a lower cover of a lower cap of a tank member, with the lower cover having at least one outlet through which a fluid filled in the tank member is discharged, the vortex prevention apparatus including: a prevention body having a cone shape based on an apex portion; spacing members extending longitudinally and laterally from the prevention body; and mesh hole portions formed through an edge of the prevention body by the spacing members.

The vortex prevention apparatus according to the present disclosure may further include: a fixing flange formed on edges of the spacing members by protruding in a ring shape therefrom so that the fixing flange is coupled to the lower cover.

Here, the fixing flange may be integrally coupled to the lower cover.

Here, each of the mesh hole portions may have a shape of an equilateral trapezoid.

An insulation tank according to the present disclosure includes: a hollow open cylinder part with an open upper end portion and an open lower end portion in an upright state thereof; an upper cap configured to seal the upper end portion of the open cylinder part; and a lower cap configured to seal the lower end portion of the open cylinder part, wherein the lower cap includes: a lower dome coupled to the lower end portion of the open cylinder part and having a lower cap opening formed through a central portion thereof; a lower cover coupled to the lower dome to seal the lower cap opening and having at least one outlet through which a fluid filled inside is discharged; and a prevention module configured to be coupled to the lower cover and to prevent a vortex of the fluid discharged through the outlet, wherein the prevention module includes the vortex prevention apparatus according to the present disclosure.

According to the vortex prevention apparatus and the insulation tank including the same according to the present disclosure, it is possible to prevent a vortex from being generated at an outlet provided in a tank member such as an insulation tank when a fluid filled in the tank member is being discharged, and to minimize a change in the flow rate of the fluid being discharged through the outlet.

In addition, according to the present disclosure, it is possible for the cone-shaped prevention body to allow a remaining fluid to gather on the edge of the prevention body without spreading widely, to maximize a vortex prevention performance while a fluid passes through the mesh hole portions, and to maximize the discharge flow rate of the remaining fluid.

In addition, according to the present disclosure, through the additional configuration of the fixing flange, it is possible to improve a coupling force between the prevention body and the lower cover, and prevent the movement of the prevention body.

In addition, according to the present disclosure, through the integration of the fixing flange and the lower cover, it is possible to maximize the convenience of manufacturing and installation.

In addition, according to the present disclosure, through the limitation of the shape of the mesh hole portion, it is possible to stably transfer a remaining fluid delivered from the prevention body to the outlet and to maximize a vortex prevention performance.

In addition, according to the present disclosure, it is possible to stably distribute a remaining fluid to the lower cover and to minimize the change of a flow rate in the outlet.

BRIEF DESCRIPTION OF THE DRAWINGS

FIGS. 4A and 4B are views illustrating the behavior of a fluid discharged through a plurality of outlets depending on the presence or absence the prevention module in the insulation tank according to an embodiment of the present disclosure, wherein FIG. 4A illustrates the behavior of a fluid discharged through the plurality of outlets from the insulation tank provided with the prevention module at 0.1 seconds, and FIG. 4B illustrates the behavior of a fluid discharged through the plurality of outlets from the insulation tank without the prevention module at 0.1 seconds.

FIGS. 6A and 6B are views illustrating the behavior of a fluid discharged through one outlet depending on the presence or absence of the prevention module in the insulation tank according to an embodiment of the present disclosure, wherein FIG. 6A illustrates the behavior of a fluid discharged through one outlet from the insulation tank provided with the prevention module at 0.1 seconds, and FIG. 6B illustrates the behavior of a fluid discharged through one outlet from the insulation tank without the prevention module at 0.1 seconds.

DETAILED DESCRIPTION

Figure 1:
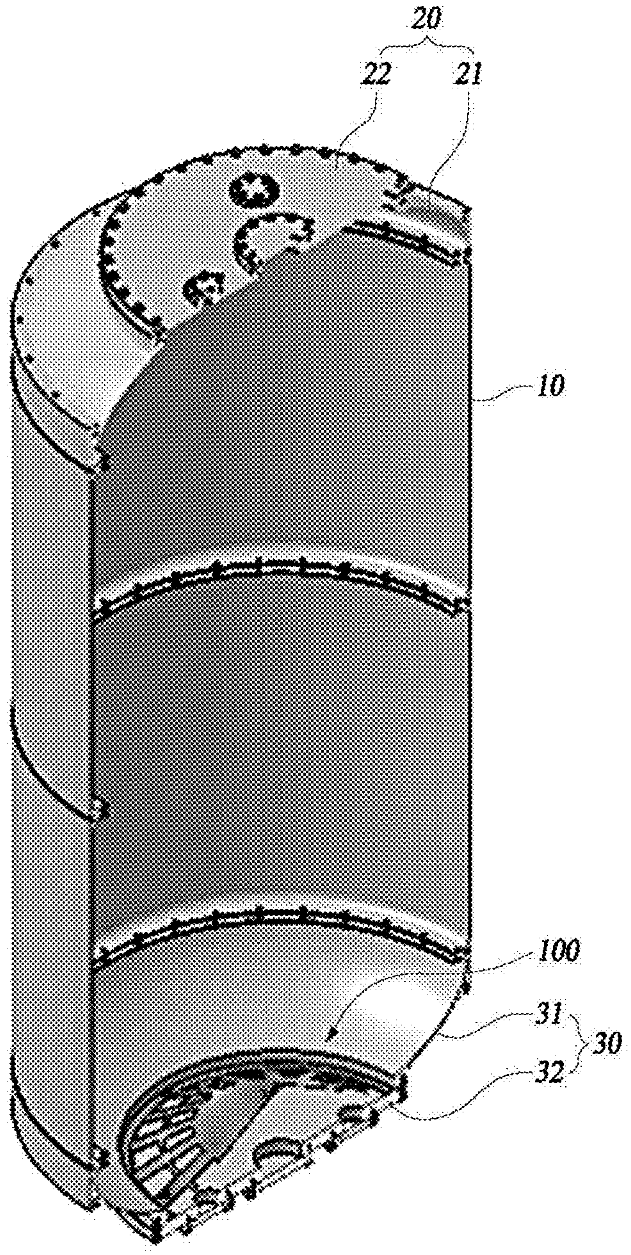
FIG. 1 is a cross-sectional perspective view illustrating an insulation tank according to an embodiment of the present disclosure.
Figure 2:
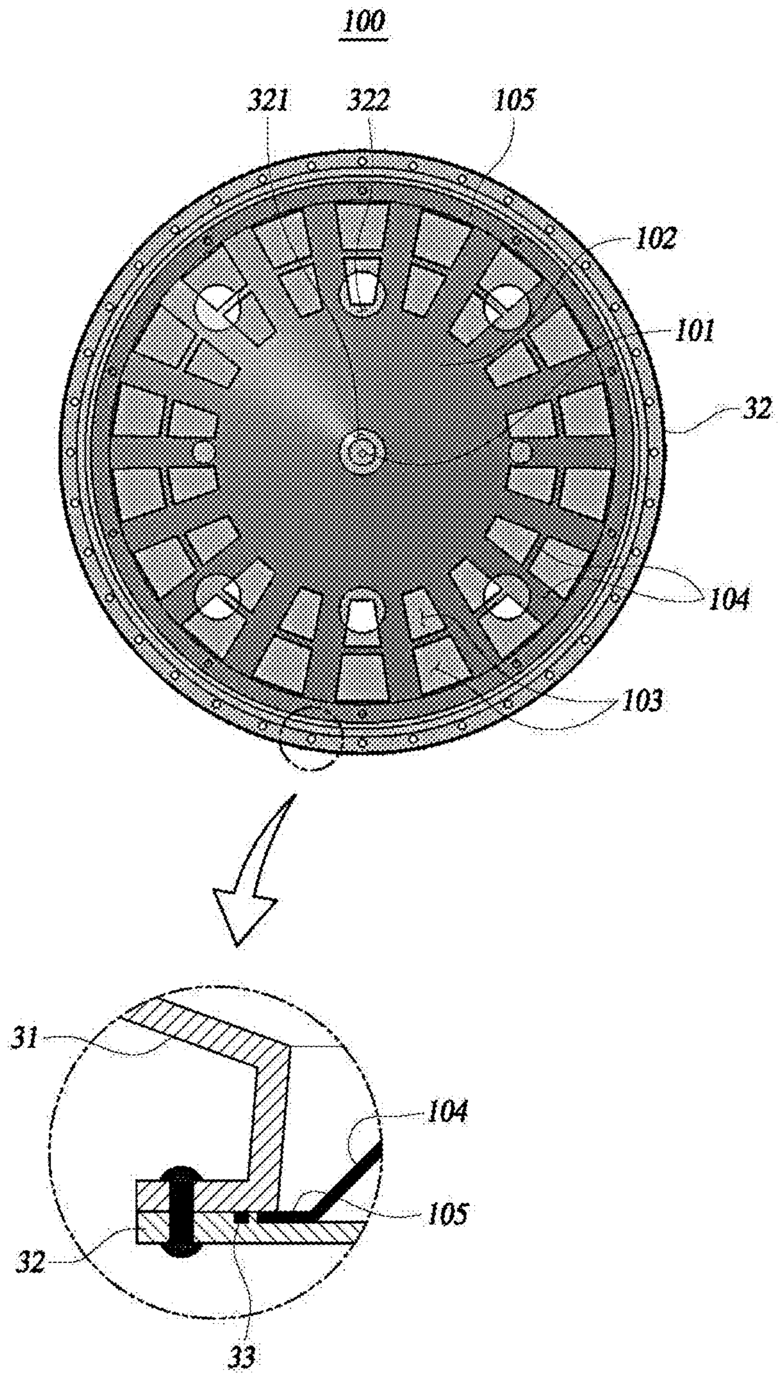
FIG. 2 is a plan view illustrating a prevention module and an enlarged cross-sectional view of a main part thereof in the insulation tank according to an embodiment of the present disclosure.

Hereinafter, an embodiment of a vortex prevention apparatus and an insulation tank including the same according to the present disclosure will be described with reference to the accompanying drawings. In this case, the present disclosure is not restricted or limited by the embodiment. In addition, when describing the present disclosure, detailed descriptions of known functions or configurations may be omitted to make the gist of the present disclosure clear.

Referring to FIGS. 1 to 6B, the insulation tank according to an embodiment of the present disclosure may be a container filled with fluid inside and may include an open cylinder part 10, an upper cap 20, and a lower cap 30. Here, the fluid may be composed of a cryogenic liquid oxidizer to generate propulsion for a space launch vehicle.

The open cylinder part 10 has a hollow cylinder shape with an open upper end portion and an open lower end portion in an upright state thereof.

Although not shown, the open cylinder part 10 may have a double walled structure. More specifically, the open cylinder part 10 may include a flat plate portion having a flat outer peripheral surface, an uneven portion slidably coupled to the flat plate portion, and multiple load dispersing spaces that are ring-shaped due to a portion of the uneven portion spaced apart from the flat plate portion and are arranged to be spaced apart from each other in the height direction of the open cylinder part. The flat plate portion and the uneven portion have a hollow cylindrical shape with an open upper end portion and an open lower end portion in an upright state thereof.

The upper cap 20 seals the upper end portion of the open cylinder part 10. It is advantageous for the upper cap 20 to have a dome shape to withstand a contraction force caused by a fluid.

The upper cap 20 may include an upper dome 21 coupled to the upper end portion of the open cylinder part 10 and having an upper cap opening formed through a central portion thereof, and an upper cover 22 coupled to the upper dome 21 to seal the upper cap opening and having at least one inlet for filling the inside of the open cylinder part 10 with a fluid.

An upper flange is provided on the edge of the upper cap opening in the upper dome 21, and the upper flange and the edge of the upper cover 22 may be coupled to each other by using a fastening member.

An upper sealing groove part is formed to be recessed in a ring shape on at least one of the upper flange and the edge of the upper cover 22, and an upper sealing member is coupled to the upper sealing groove part. A sealing force between the upper flange and the edge of the upper cover 22 may be improved by the upper sealing member.

The lower cap 30 seals the lower end portion of the open cylinder part 10. It is advantageous for the lower cap 30 to have a dome shape to withstand a contraction force caused by a fluid.

The lower cap 30 may include a lower dome 31 coupled to the lower end part of the open cylinder part 10 and having a lower cap opening formed through a central portion thereof, a lower cover 32 coupled to the lower dome 31 to seal the lower cap opening and having at least one outlet through which a fluid filled inside is discharged, and a prevention module 100 that is coupled to the lower cover 32 and prevents a vortex of the fluid discharged through the outlet.

The outlet provided in the lower cover 32 may include a central outlet 321 provided in the central portion of the lower cover 32, and one or more spacing outlets 322 that are spaced apart from the central outlet 321 and are spaced apart from each other.

A lower flange is provided on the edge of the lower cap opening in the lower dome 31, and the lower flange and the edge of the lower cover 32 may be coupled to each other by using a fastening member.

A lower sealing groove part is formed to be recessed in a ring shape on at least one of the lower flange and the edge of the lower cover 32, and a lower sealing member 33 is coupled to the lower sealing groove part. A sealing force between the lower flange and the edge of the lower cover 32 may be improved by the lower sealing member 33.

The prevention module 100 includes the vortex prevention apparatus according to an embodiment of the present disclosure. In the embodiment of the present disclosure, the vortex prevention apparatus is described as being provided in the insulation tank according to the embodiment of the present disclosure, but is not limited thereto and may be applied to various known tank members.

The vortex prevention apparatus according to an embodiment of the present disclosure may include a prevention body 102 having a cone shape based on an apex portion 101, spacing members 104 extending longitudinally and laterally from the prevention body 102, and mesh hole portions 103 formed through the edge of the prevention body 102 by the spacing members 104. In other words, the prevention body 102 may have the shape of a circular cone.

It is advantageous for each of the mesh hole portions 103 to have the shape of an equilateral trapezoid.

The vortex prevention apparatus according to an embodiment of the present disclosure may further include a fixing flange 105 formed on the edges of the spacing members 104 by protruding in a ring shape therefrom so that the fixing flange 105 is coupled to the lower cover 32.

In response to this, the lower cover 32 may be provided with a flange seating part 323 on which the fixing flange 105 is seated.

The fixing flange 105 may be integrally coupled to the lower cover 32. The fixing flange 105 is seated on the flange seating part 323 while being stacked and supported on the lower cover 32, and the fixing flange 105 and the lower cover 32 may be integrally coupled to each other by using a fastening member.

Figure 3:
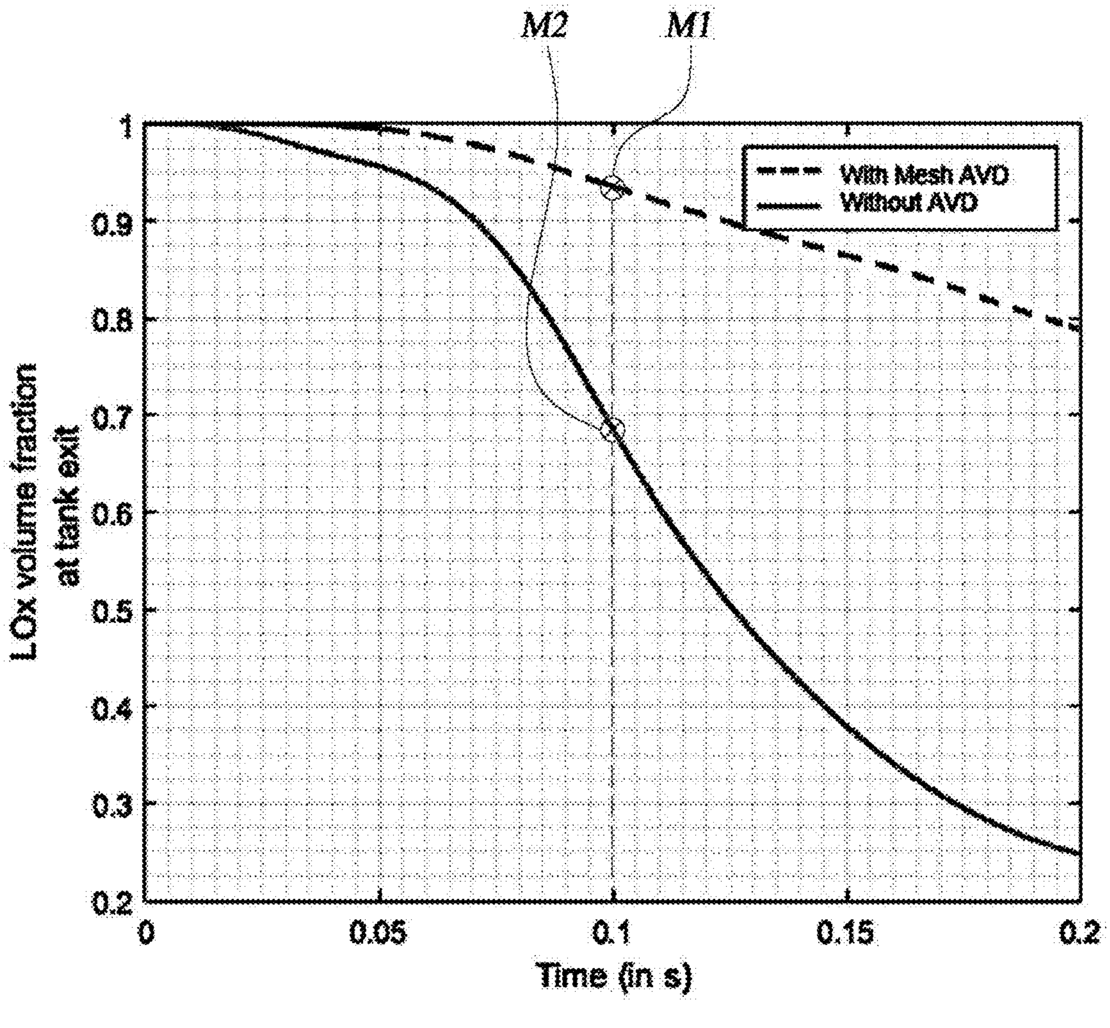
FIG. 3 is a graph illustrating the liquid volume fraction of fluid discharged through a plurality of outlets in time series depending on the presence or absence of the prevention module in the insulation tank according to an embodiment of the present disclosure.

The graph of FIG. 3 has a blue curve which is a curve passing through point M1 and illustrates change in a liquid volume fraction of a fluid when the fluid is discharged through two or more outlets in a case in which the vortex prevention apparatus according to an embodiment of the present disclosure is provided. In addition, the graph of FIG. 3 has a red curve which is a curve passing through point M2 and illustrates change in a liquid volume fraction when a fluid is discharged through two or more outlets in a case in which the vortex prevention apparatus according to an embodiment of the present disclosure is not provided.

Figure 4A:
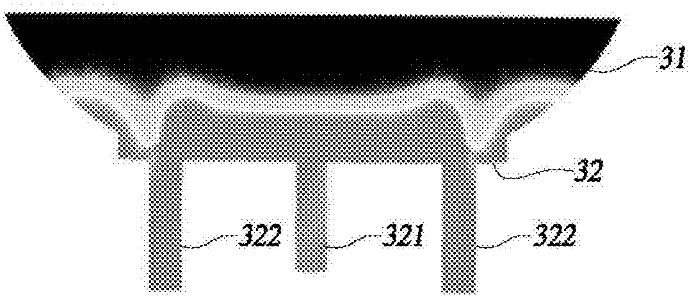

In the case in which the vortex prevention apparatus according to the embodiment of the present disclosure is provided, when the fluid is discharged through two or more outlets, it can be seen that the change in the liquid volume fraction gradually decreases as time passes like the blue curve illustrated in FIG. 3. In addition, as illustrated in FIG. 4A, at a time point M1 at which 0.1 seconds have elapsed and a fluid is discharged through two or more outlets, a remaining fluid is distributed approximately evenly at the upper portion of the lower cover 32 at the lower cap opening, and is stably discharged through the two or more outlets by pressurized gas.

Figure 4B:
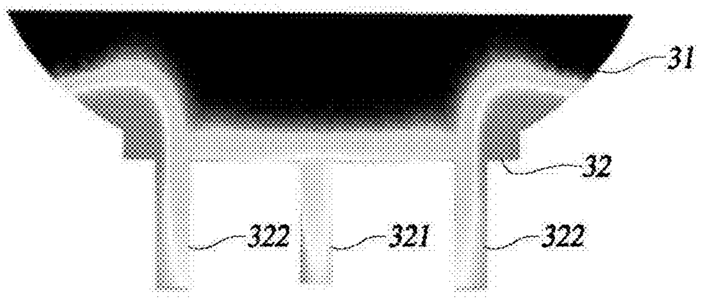

However, in a case in which the vortex prevention apparatus according to the embodiment of the present disclosure is not provided, it may be checked that when a fluid is discharged through two or more outlets, a liquid volume fraction decreases rapidly as time passes like the red curve illustrated in FIG. 3. In addition, as illustrated in FIG. 4B, at a time point M2 at which 0.1 seconds have elapsed and a fluid is discharged through two or more outlets, there is a problem in that a remaining fluid is concentrated at the edge of the lower cover 32 at the lower cap opening, and the remaining fluid and pressurized gas are together discharged to the two or more outlets and flow into a combustion chamber.

Figure 5:
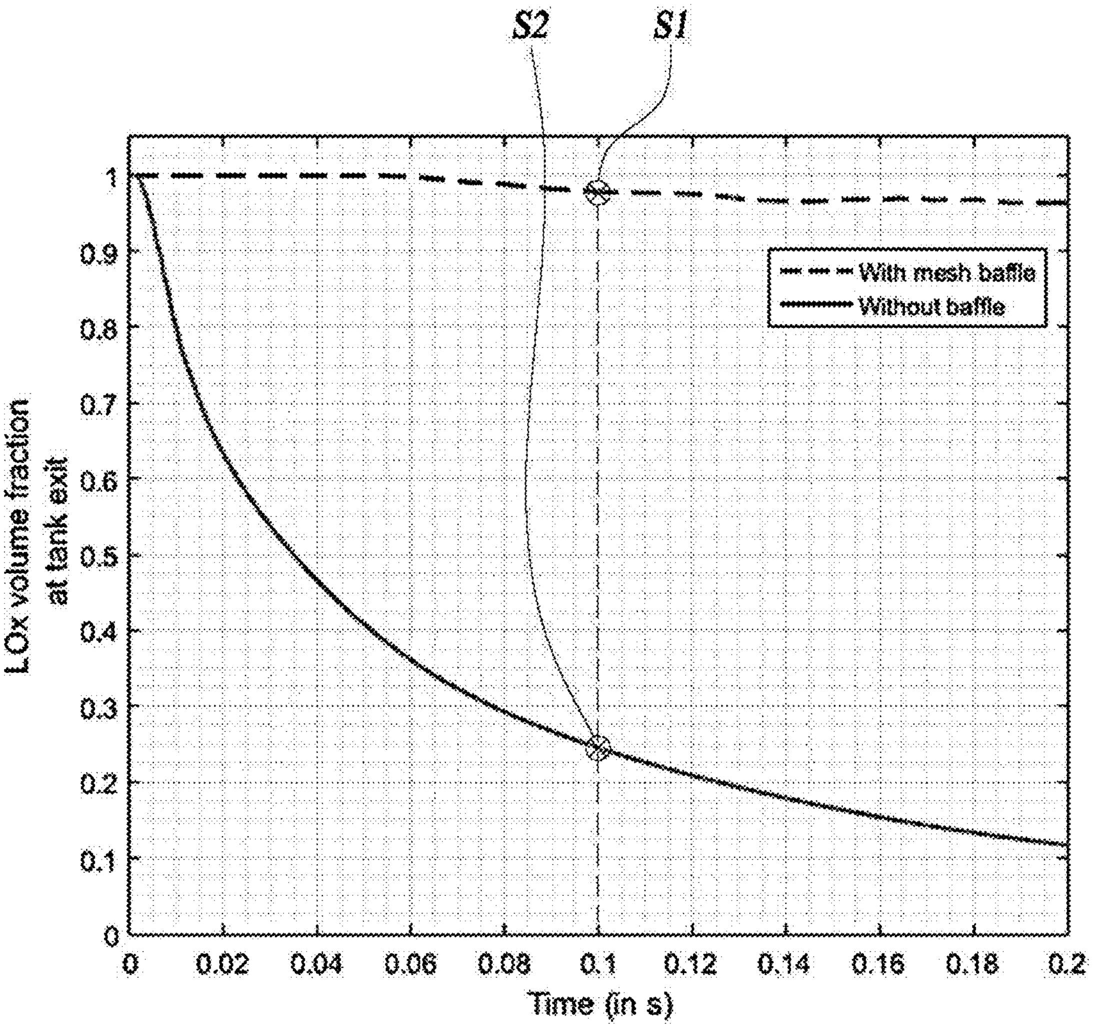
FIG. 5 is a graph illustrating the liquid volume fraction of a fluid discharged through one outlet in time series depending on the presence or absence of the prevention module in the insulation tank according to an embodiment of the present disclosure.

In the graph of FIG. 5, a blue curve is a curve passing through point S1, and illustrates a change in a liquid volume fraction when a fluid is discharged through one outlet in a case in which the vortex prevention apparatus according to the embodiment of the present disclosure is provided. In addition, in the graph of FIG. 5, a red curve is a curve passing through point S2, and illustrates a change in a liquid volume fraction when a fluid is discharged through one outlet in a case in which the vortex prevention apparatus according to the embodiment of the present disclosure is not provided.

Figure 6A:
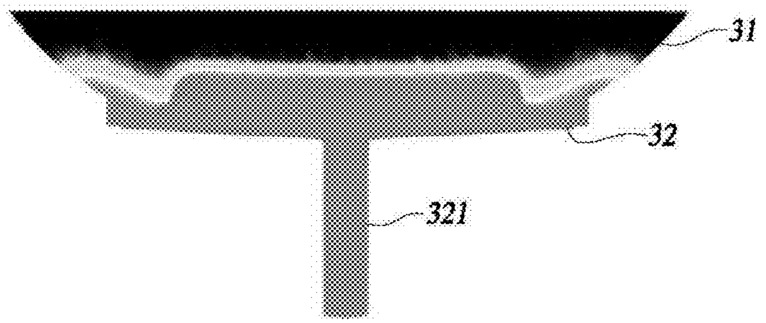

In the case in which the vortex prevention apparatus according to the embodiment of the present disclosure is provided, it may be checked that when a fluid is discharged through one outlet, a liquid volume fraction decreases gradually as time passes like the blue curve illustrated in FIG. 5. In addition, as illustrated in FIG. 6A, at a time point S1 at which 0.1 seconds have elapsed and a fluid is discharged through one outlet, a remaining fluid is distributed approximately evenly at the upper portion of the lower cover 32 at the lower cap opening, and pressurized gas first pressurizes the edge of the remaining fluid distributed on the upper side of the lower cover 32, so the remaining fluid is stably discharged through the one outlet by the pressurized gas.

However, in the case in which the vortex prevention apparatus according to the embodiment of the present disclosure is not provided, it may be checked that when a fluid is discharged through one outlet, a liquid volume fraction decreases rapidly as time passes like the red curve illustrated in FIG. 5. In addition, as illustrated in FIG. 6B, at a time point S2 at which 0.1 seconds have elapsed and a fluid is discharged through one outlet, there is a problem in that a remaining fluid is concentrated at the edge of the lower cover 32 at the lower cap opening, and the remaining fluid and pressurized gas are together discharged to the one outlet and flow into a combustion chamber.

Figure 6B:
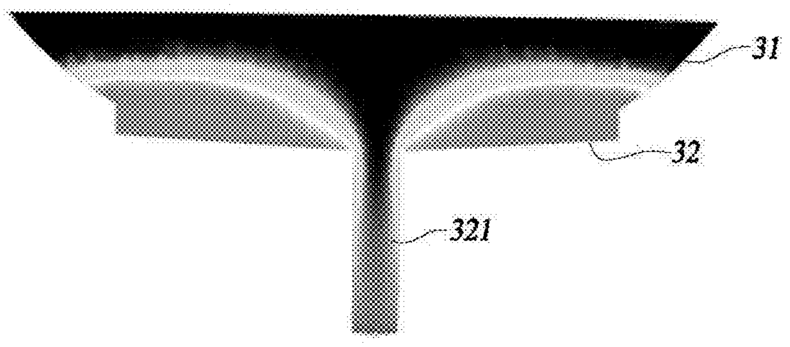

In FIGS. 4 and 6B, a red part represents a remaining fluid remaining in the lower cap 30, and a blue part represents pressurized gas that pressurizes the remaining fluid in the lower cap 30.

According to the vortex prevention apparatus and the insulation tank including the same described above, it is possible to prevent a vortex from being generated at an outlet provided in a tank member such as the insulation tank when a fluid filled in the tank member is being discharged, and to prevent a change in the flow rate of the fluid being discharged through the outlet.

In addition, it is possible for the cone-shaped prevention body 102 to allow a remaining fluid to gather on the edge of the prevention body 102 without spreading widely, to maximize a vortex prevention performance while a fluid passes through the mesh hole portions 103, and to maximize the discharge flow rate of the remaining fluid.

In addition, through the additional configuration of the fixing flange 105, it is possible to improve a coupling force between the prevention body 102 and the lower cover 32, and prevent the movement of the prevention body 102.

In addition, through the integration of the fixing flange 105 and the lower cover 32, it is possible to maximize the convenience of manufacturing and installation.

In addition, through the limitation of the shape of the mesh hole portion 103, it is possible to stably transfer a remaining fluid delivered from the prevention body 102 to the outlet and to maximize a vortex prevention performance.

In addition, it is possible to stably distribute a remaining fluid to the lower cover 32 and to minimize the change of a flow rate in the outlet.

As described above, the exemplary embodiments of the present disclosure have been described with reference to the drawings, but those skilled in the art may variously modify or change the embodiments within the scope of the spirit and scope of the present disclosure as set forth in the claims below.

REFERENCE NUMERALS

10: Open cylinder part
20: Upper cap
21: Upper dome
22: Upper cover
30: Lower cap
31: Lower dome
32: Lower cover

321: Central outlet
322: Spacing outlet
323: Flange seating part
100: Prevention module
101: Apex portion
102: Prevention body
103: Mesh hole portion
104: Spacing member
105: Fixing flange

What is claimed is:

1. An insulation tank comprising:

a hollow open cylinder part with an open upper end portion and an open lower end portion in an upright state thereof;

an upper cap configured to seal the upper end portion of the open cylinder part; and a lower cap configured to seal the lower end portion of the open cylinder part, wherein the lower cap comprises:

a lower dome coupled to the lower end portion of the open cylinder part and having a lower cap opening formed through a central portion thereof;

a lower cover coupled to the lower dome to seal the lower cap opening and having at least one outlet through which a fluid filled inside is discharged; and a prevention module configured to be coupled to the lower cover and to prevent a vortex of the fluid discharged through the outlet, and wherein the prevention module comprises a vortex prevention apparatus, which comprises:

a prevention body having a cone shape, wherein the prevention body comprises a non-perforated conical surface that extends from an apex portion and is configured to guide the fluid from the apex portion toward a rim portion of the prevention body;

spacing members extending radially and circumferentially from the prevention body; and mesh hole portions formed through the rim portion of the prevention body by the spacing members, wherein the mesh hole portions are arranged along a circumference of the rim portion to allow the fluid guided by the non-perforated conical surface to pass therethrough, wherein each of the mesh hole portions has a shape of an equilateral trapezoid.

2. The insulation tank of claim 1, wherein the vortex prevention apparatus further comprises:

a fixing flange formed on edges of the spacing members by protruding in a ring shape therefrom so that the fixing flange is coupled to the lower cover.

3. The insulation tank of claim 2, wherein the fixing flange is integrally coupled to the lower cover.

* * * * *